United States Patent [19]

Nelson et al.

[11] Patent Number: 5,778,390
[45] Date of Patent: Jul. 7, 1998

[54] METHOD AND SYSTEMS FOR CREATING DUPLICATING, AND ARCHIVING DATABASE FILES

[75] Inventors: Thomas J. Nelson, Lakewood; Narendra S. Lulla, Broomfield, both of Colo.

[73] Assignee: Electronic Data Systems Corporation, Plano, Tex.

[21] Appl. No.: 660,636

[22] Filed: Jun. 7, 1996

[51] Int. Cl.[6] .............................................. G06F 17/30
[52] U.S. Cl. .......................... 707/204; 707/201; 707/102
[58] Field of Search .................................... 707/102, 201, 707/204

[56] References Cited

U.S. PATENT DOCUMENTS

| | | | |
|---|---|---|---|
| 5,129,082 | 7/1992 | Tirfing | 707/3 |
| 5,291,583 | 3/1994 | Bapat | 395/500 |
| 5,291,595 | 3/1994 | Martins | 700/200 |
| 5,485,626 | 1/1996 | Lawlor | 395/683 |
| 5,559,991 | 9/1996 | Kanfi | 711/162 |
| 5,596,744 | 1/1997 | Dao et al. | 707/10 |
| 5,642,505 | 6/1997 | Fushimi | 707/204 |

FOREIGN PATENT DOCUMENTS

0 614 150 A2  9/1994  European Pat. Off. .

*Primary Examiner*—Thomas G. Black
*Assistant Examiner*—Diane D. Mizrahi
*Attorney, Agent, or Firm*—L. Joy Griebenow

[57] ABSTRACT

A method and system for creating and manipulating database files comprises a plurality of database files (19, 23, 50) and an object maintenance module (26). The database files (19, 23, 50) may generate database objects. The object maintenance module (26) may automatically generate a batch execution file (42). The batch execution file (42) may automatically execute the database files (19, 23, 50). In another aspect of the invention, the method and system may comprise a first database environment (22, 24) and a migration module (36). The first database environment (22, 24) may include a first set of database files (19, 23). The migration module (36) may automatically generate a second set of database files (50) from the first set of database files (19, 23). The second set of database files (50) are for use in connection with a second database environment (48). The migration module (36) may transfer the second database files (19, 23) to the second database environment (48).

21 Claims, 4 Drawing Sheets

METHOD AND SYSTEMS FOR CREATING DUPLICATING, AND ARCHIVING DATABASE FILES

TECHNICAL FIELD OF THE INVENTION

The present invention relates generally to database systems, and more particularly, to a method and system for creating and manipulating database files.

BACKGROUND OF THE INVENTION

The development and testing phase of creating a software application in a UNIX environment generally begins by building a database environment for initial unit testing. This involves the creation and management of hundreds of database files containing DDL (the data definition language used to build the database) and UNIX scripts (the program files that are used to run the DDL). Database files are frequently updated, deleted, and created throughout the development process as design and testing of separate sections of the application proceed. When the individual sections of the application have been developed and tested, a separate and duplicate environment is usually created for the specific purpose of testing the application as a whole. Sometimes a third testing environment is also created for end user testing. Changes made to one environment should be applied to the other environments. Keeping each environment "in sync" or at the appropriate release level is critical to the integrity of the testing process. When testing is complete, the environment is copied over to a production environment, where the application is used for its intended purpose. Normally, at least one separate test environment, known as a production maintenance environment, is still maintained and kept in sync with the production environment for bug fixes and enhancement requests.

In the past, the initial construction of the unit testing database has been achieved by manually creating the DDL database files for every database object. The database administrator creating these files is responsible for applying all defined standards such as directory structures, naming conventions, documentation, and security to name a few. The database administrator must also manually create all UNIX script database files to execute the DDL database files and must apply all appropriate standards to these scripts as well.

As development and unit testing continue, changes are made to the existing DDL database files manually and DDL database files are added, modified or removed as needed. Any addition or deletion of DDL database files, and many modifications as well, require a change be made to at least one UNIX script. Often several scripts are affected.

To create a new test environment on the same computer system that is separate from the initial unit test environment, every DDL and script file must be copied to new directories, and updates must be made to each file manually by the database administrator. This process is repeated for each new test environment created.

When more than one environment is in use at a time, the burden of keeping the databases in sync or at the appropriate release level is a completely manual process managed by the database administrator through direct manipulation of the files.

The creation of a production database requires particular care. All files must be moved to the production computer system manually using appropriate directories and permissions. Ideally, DDL and script files should be moved to production with a minimal number of changes from the test environment to minimize the chance of introducing problems as a result of human error. Unfortunately, changes must be made to adapt DDL and script files for use in the production environment. These files are then used untested to create the production database.

Changes to the database files for use in production environment are manual, and it is the database administrator's responsibility to keep those manual changes in sync in the production maintenance environment. Production maintenance may require the addition of new files or deletion of old ones as well as updates to existing files. There is generally no record of these changes, and it is not possible to view or recover to a previous version of a file if a change needs to be reversed. If for any reason the DDL or script files are lost or get out of sync with the database, they must be manually restored from a previous backup or manually recreated.

SUMMARY OF THE INVENTION

While the industry has previously individually automated portions of some of the functions described above, it is an object of the present invention to provide a database system and method which can automatically generate database objects and can automatically generate a batch execution file. Thus, in accordance with the present invention, a method and system for creating and manipulating database files are provided that substantially eliminates or reduces the disadvantages and problems associated with prior database systems.

In accordance with the present invention, the database system may comprise a plurality of database files and an object maintenance module. The database files may automatically generate database objects. The object maintenance module may automatically generate a batch execution file. The batch execution file may execute the database files.

More specifically, in accordance with one embodiment, the object maintenance module may arrange an execution order of the database files executed by the batch execution file. The execution order may be in accordance with a predefined priority scheme. Additionally, the database system may stop execution of a database file being executed by the batch execution file in response to an execution error. The database file may receive edits of that database file. Thereafter, the database system may resume execution of the database file.

In accordance with another aspect of the present invention, the database system may comprise a first database environment and a migration module. The first database environment may include a first set of database files. The migration module may automatically generate a second set of database files from the first set of database files. The second set of database files are for use in connection with a second database environment. The migration module may transfer the second database files to the second database environment.

Important technical advantages of the present invention include an improved method and system for creating and manipulating database files. In particular, the database system may generate a batch execution file operable to execute a plurality of database files. Accordingly, a user need not independently execute the database files or manually create a batch execution file to execute a number of database files.

Another important technical advantage of the present invention includes providing a database system that synchronizes a database across a number of test and/or production environments. In particular, the invention generates from a first set of database files of a first database environment a second set of database files. The second set of database files may be used in connection with a second database environment. The invention may transfer the second set of database files to the second database environment. The second database environment may be another test environment or a production environment. Additionally, the second environment may be remote from the first environment and the second set of database files may be transmitted over a network.

Other technical advantages are readily apparent to one skilled in the art from the following figures, descriptions, and claims.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figure 1:
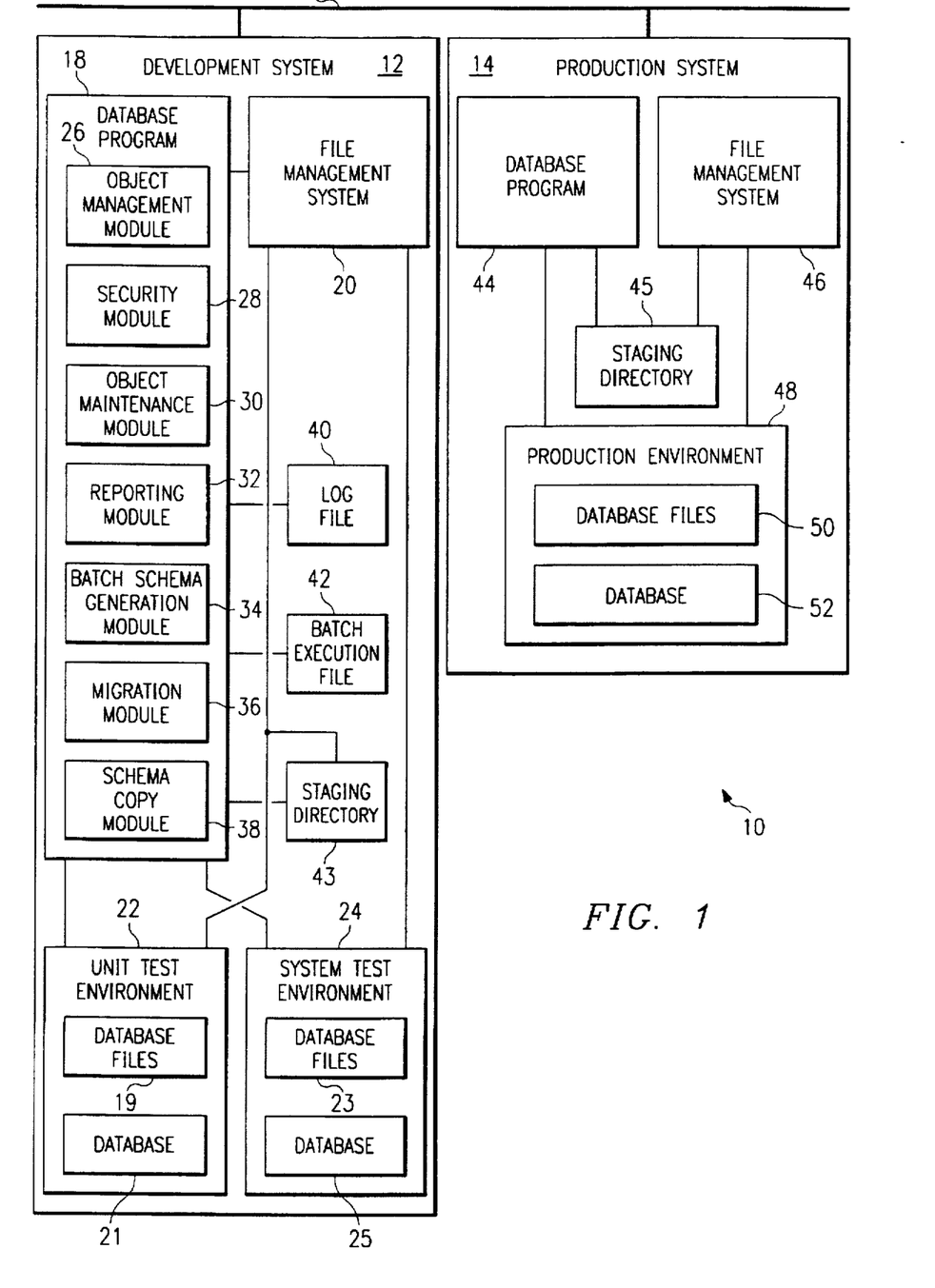
FIG. 1 is a schematic block diagram of a computer network system for creating and manipulating database files in accordance with one embodiment of the present invention.

FIG. 1 is a schematic block diagram of a computer network system 10 for creating and manipulating database files in accordance with one embodiment of the present invention. Network 10 comprises a plurality of computer systems 12 and 14 in communication with a network data bus 16. Computer system 12 is intended for use in the development and testing of a software application, and is therefore known as a development system.

Development system 12 includes a database program 18 for creating and manipulating database files in accordance with the invention, and a file management system 20 for managing the files created and modified by database program 18. A unit test environment 22 is used in the development and testing of individual sections of the software application. Unit test environment 22 includes a plurality of database files 19 and a database 21 created by execution of the database files 19. Database files 21 may include, for example, a plurality of database definition language (DDL) files which define and generate database objects, and a plurality of UNIX script files which execute the DDL files.

Development system 12 also includes a system test environment 24 for development and testing of the software application as a whole. System test environment 24 includes a plurality of database files 23 and a database 25 created by execution of the database files 23. Like database files 19, database files 23 may include a plurality of DDL files and UNIX script files.

File management system 20 is operable to manage the database files 19 and 23 in the test environments 22 and 24. More specifically, file management system 20 may act as a library, allowing database files to be checked out, edited and checked in. In this manner, file management system 20 restricts access to database files 19 and 23 by allowing only one user at a time to check out and edit any given database file.

File management system 20 may also act as an archive, storing past and present versions of database files 19 and 23. For example, if a user modifies a database file using database program 18, file management system 20 may register the changes and may store the unchanged version of the database file as well as the updated version. File management system 20 may therefore allow a user to reconstruct a previous version of a database file if undesirable changes have been made to the database file, or if the file has been lost or corrupted.

Database program 18 includes a plurality of modules 26–38 for performing various database file manipulation functions. The primary function of modules 26–38 is to generate, alter and delete database files 19 and 23. In general, modules 26–38 do not manipulate database objects directly. Thus, it will be understood that a description of a module function such as "creating a table" actually refers to the process of generating or altering a database file such that, when the database file is executed, the appropriate database table will be created.

For exemplary purposes, the functions of modules 26–38 will be described with respect to unit test environment 22. However, it will be understood that analogous functions can be performed in system test environment 24, or any other test environment on development system 12. Furthermore, it will be understood that terms such as "table," "view," "index" and other database terms are well known in the art of database administration, and are given their commonly understood meaning in the following description.

Object management module 26 of database program 18 is operable to automatically create, modify and execute database files in unit test environment 22. More specifically, object management module 26 includes a tablespace management submodule for creating, altering and deleting tablespaces from database 21. A table and view management submodule within object management module 26 is operable to create, alter and delete tables and views from database 21. An index management submodule is operable to create, alter and delete indexes, as well as foreign and primary keys, from database 21. A user management submodule is operable to create, alter and delete users from database 21. A role management submodule is operable to create, alter and delete roles from database 21. Other functions performed by object management module 26 include creating and deleting public and private synonyms; creating and deleting public and private database links; creating, altering and deleting sequences; creating, altering and deleting system table spaces; and creating, altering and deleting rollback segments.

Security module 28 is operable to grant and revoke privileges for users and roles. Security module 28 can grant or revoke system privileges or object privileges for any number of users and roles.

Object maintenance module 30 is operable to automatically create and execute batch execution files such as batch execution file 42. A batch execution file comprises a plurality of commands which, when executed, will cause a plurality of database files 19 to be executed. A batch execution file may be, for example, a UNIX script which executes a plurality of other UNIX scripts. These other UNIX scripts in turn execute a plurality of DDL files. The UNIX scripts and DDL files are database files 19.

Due to the sequential nature of the operations performed by database files 19, batch execution file 42 executes database files 19 in a particular order, in accordance with a predefined priority scheme, in order to properly create database objects. For example, it is well known in the art that creation of a primary key is a necessary precursor to the creation of a foreign key. Object maintenance module 30 is therefore operable to receive user input selecting a plurality of database files, to determine the correct order of execution of the database files in accordance with the predefined priority scheme, and to automatically create a batch execution file which, when executed, will in turn execute the selected database files in the proper order. The method performed by object maintenance module 30 in creating and executing batch execution file 42 will be described more fully below in connection with FIG. 4.

Database reporting module 32 is operable to generate a variety of user-requested reports concerning database 21. More specifically, reporting module 32 is operable to automatically report information about objects, tablespaces, tablespace quotas for users, free space, table size information, other table statistics, index size, other index statistics, and other database information.

Batch schema generation module 34 is operable to automatically "reverse engineer" a database object. This may be useful, for example, when a user wishes to be able to reproduce a database object which was not originally created by database program 18. Such an object is known as a "foreign" database object. Because the foreign database object was not created by database program 18, the UNIX script and DDL files to reproduce the foreign object are not present in database files 19. Thus, batch schema generation module 34 reverse engineers the foreign database object to determine the database files which would be required to regenerate the object. The method performed by batch schema generation module 34 is described more fully below in connection with FIG. 6.

Migration module 36 is operable to automatically "migrate", or transfer, test environment 22 from development system 12 to another system, such as production system 14. More particularly, migration module 36 is operable to read database files 19 from test environment 22, to transfer a suitably altered copy of database files 19 to a first staging directory 43, and to transfer the altered database files from the first staging directory 43 to a second staging directory, such as staging directory 45. File management system 46 may then be used to copy the database files from staging directory 45 into production environment 48. File management system 46 then acts as a library and archive as previously described with respect to the database files 50 copies into production environment 48. The migration method performed by migration module 36 and file management system 20 is described more fully below in connection with FIG. 5.

In the normal course of development of a software application, the application would be tested in unit test environment 22, then in system test environment 24, and finally put into production in production environment 48. Thus, migration module 36 may be used to migrate database files from system test environment 24 to production environment 48. Schema copy module 38 is operable to automatically migrate one test environment to another. Thus, for example, schema copy module 38 could be used to migrate unit test environment 22 to system test environment 24.

Schema copy module 38 operates in a manner analogous to the operation of migration module 36. Schema copy module 38 reads database files 19, transfers a suitably altered copy of database files 19 to a first staging directory 43, and transfers the altered database files from the first staging directory 43 to a second staging directory (not shown) within development system 12. File management system 20 may then be used to copy the database files from the second staging directory into system test environment 24. File management system 20 will also register the database files 23 which have been copied into system test environment 24, and will act as a library and archive for database files 23 in the manner previously described.

It is well known in the art of computer programming that a module is a collection of subroutines and data structures that performs a particular task or function. Thus, it will be understood that modules 26–38 of database program 18 have been separately identified and discussed for the convenience of the reader, and that the functions performed by any one of the modules could be performed by any other module, or by any other part of database program 18.

After an application has been developed and tested using development system 12, the application is put into use in its intended operating environment in computer system 14, known as a production system. Production system 14 includes a database program 44 which is substantially similar to database program 18. Production system 14 also includes a file management system 46 which is substantially identical to file management system 20. A production environment 48, which is similar but not identical to testing environments 22 and 24, includes a plurality of database files 50 and a database 52. Production environment 48 may differ from testing environments 22 and 24 in a variety of ways. As one example, a table used in the testing process may have 100 records. However, a corresponding table in production environment 48 may have 100,000 records requiring it to be sized much larger than in the test environment 22 or 24. In another example, a table used in the testing process may allow access to all users with little or no security where a corresponding table in the production environment 48 may be restricted to very few privileged users. Other potential differences between the production environment 48 and the testing environments 22 and 24 are well known to those skilled in the art.

File management system 46 is also operable to transfer database files from staging directory 43 to production environment 48 and file management system 46. File management system 46 then operates as a library and archive for database files 50, as was previously described with respect to file management system 20 and database files 19 and 23.

The database program 18 is operable to record its actions in a log file 40. Accordingly, the database program 18 provides a record for tracking additions, modifications and deletions of database files.

Figure 2:
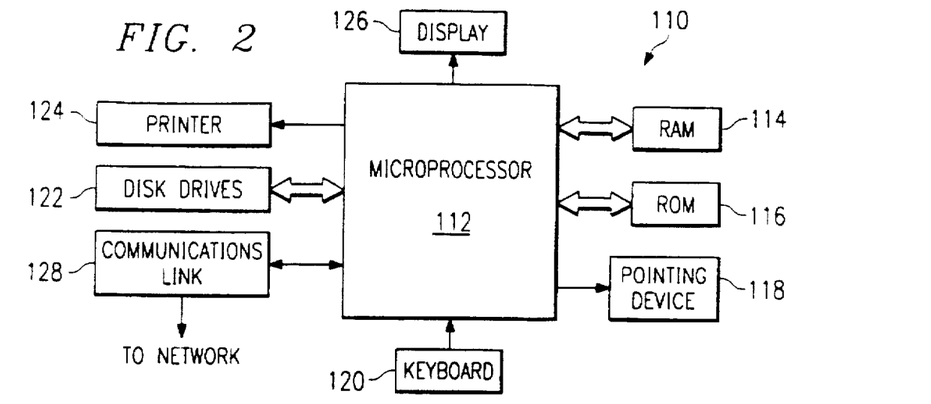
FIG. 2 illustrates a schematic block diagram of a computer system that may be used in connection with the database system of FIG. 1.

FIG. 2 illustrates a general purpose computer system 110 that may be used to create and manipulate database files in accordance with the present invention. For example, development system 12 and production system 14 may comprise such a general purpose computer system. The general purpose computer system 110 may be adapted to execute any of the well known UNIX, MS DOS, PCDOS, OS2, MOTIF, MAC-OS, X-WINDOWS and WINDOWS operating systems or other operating systems. The computer system 110 may comprise a microprocessor 112, a random access memory (RAM) 114, a read-only memory (ROM) 116, a pointing device 118, a keyboard 120, and input/output devices such as a printer 124, one or more disk drives 122, a display 126 and a communications link 128.

The present invention includes computer software, such as database programs 18 and 44 and file management systems 20 and 46, that may be stored in RAM 114, ROM 116 or the disk drives 122. The computer software is executed by the microprocessor 112. The communications link 128 may be connected to a computer network, but could be connected to a telephone line, an antenna, a gateway or any other type of communication link. The disk drives 122 may include a variety of types of storage media such as, for example, floppy disk drives, hard disk drives, CD-ROM drives or magnetic tape drives.

Figure 3:
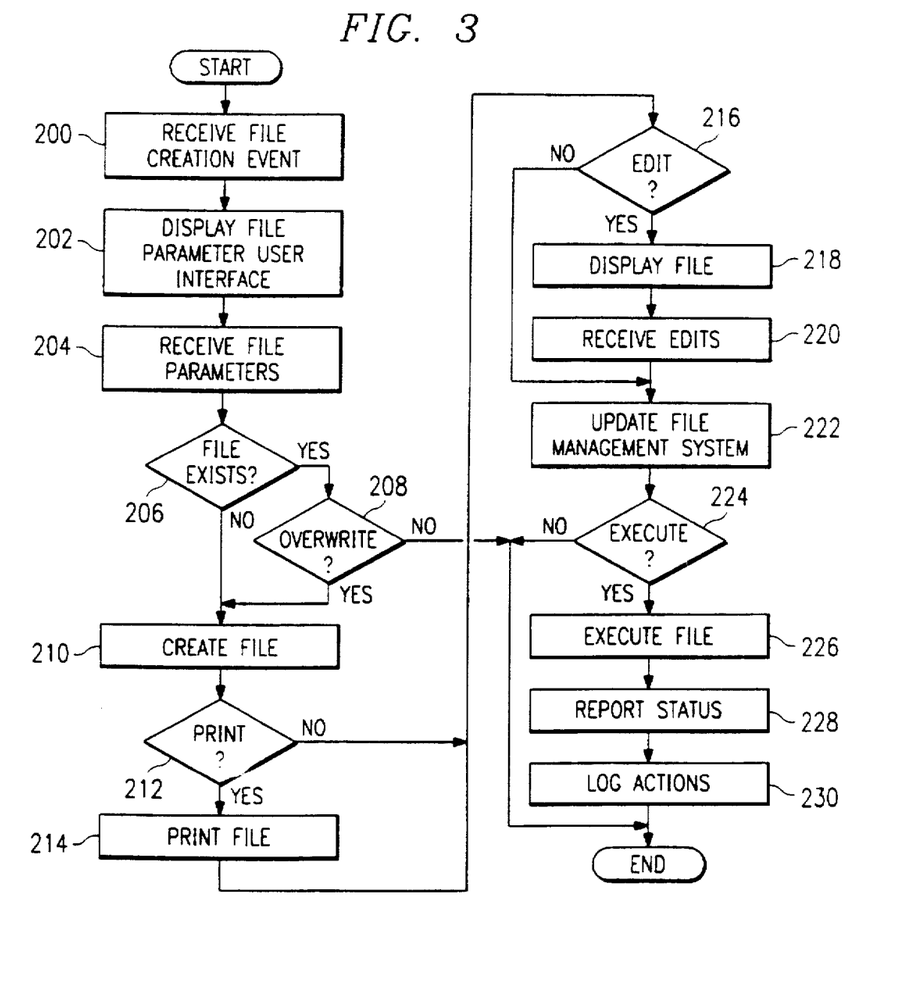
FIG. 3 is a flowchart of a method of creating database files in accordance with the present invention.

The methods of the present invention for creating and manipulating database files will now be described. FIG. 3 is a flowchart of the method of the present invention for automatically generating database files. Database files may be used to automatically generate database objects, such as tables and indexes. The method begins at step 200 in which a file creation event is received for a specified environment. For the embodiment shown by FIG. 1, the file creation event may be received by the object management module 26.

Preceding to step 202, the object management module 26 may display a file parameter user interface on the display 126. Preferably, the user interface is a graphical user interface including areas in which a user may enter specifically requested parameters. The file parameter user interface may, for example, request the parameters of the number of columns and the number of rows for a database table that is to be created by a file. A user may input the requested file parameters using the pointing device 118 and/or the keyboard 120.

At step 204, the object management module 26 receives file parameters inputted by the user. Next, at decisional step 206, the object management module 26 determines if the requested file already exists for the specified environment. In one embodiment, the object management module 26 may query database files of the environment directly. It should be understood, however, that the object management module 26 may also query the file management system 20. If the requested file already exists, the YES branch of the decisional step 206 leads to decisional step 208.

At decisional step 208, the object management module 26 determines whether the existing file is to be overwritten. In one embodiment, the existing database file may be overwritten when requested by the user. In this embodiment, the object management module 26 may inform the user of the existing file and ask whether he or she would like to overwrite that file. If an existing file is not to be overwritten, the NO branch of decisional step 208 leads to the end of the process. Thus, no action is taken. If an existing file is to be overwritten, the YES branch of decisional step 208 leads to step 210. Additionally, if the requested file does not exist at step 206 for the specified environment, the NO branch of decisional step 206 also leads to step 210.

At step 210, the object management module 26 automatically creates the requested database file. As previously discussed, the database file may include DDL files and UNIX script files. Step 210 leads to decisional step 212.

At decisional step 212, the object management module 26 determines whether the created database file is to be printed. In one embodiment, the object management module 26 may query the user as to whether he or she would like to print the database file. In this embodiment, the user may request that the database file be printed by selecting an option of the user interface. If the database file is to be printed, the YES branch of decisional step 212 leads to step 214.

At step 214, the database file including the DDL files and UNIX scripts, is printed. Step 214 leads to decisional step 216. Additionally, if the database file is not to be printed at step 212, the NO branch of decisional step 212 leads also to decisional step 216.

At decisional step 216, the object management module 26 determines whether the file is to be edited. In one embodiment, the file may be edited when requested by the user. In this embodiment, the user may request editing of the database file by choosing a selection in the user interface. If the file is to be edited, the YES branch of decisional step 216 leads to step 218.

At step 218, the database file is displayed for editing by the user. Next, at step 220, the object management module 26 receives edits to the database file. Step 220 leads to step 222. Additionally, if no edits are to be made to the database file, the NO branch of decisional step 216 leads also to step 222.

At step 222, the file management system 20 is updated. Accordingly, the file management system 20 will include the same database files as the specified environment. Step 222 leads to decisional step 224.

At decisional step 224 it is determined whether the file is to be executed. In one embodiment, the file may be executed when requested by the user. In this embodiment, the user may request execution of the database file by choosing a selection in the user interface. If the database file is not to be executed, the NO branch of decisional step 224 leads to the end of the process. Thus, the database files are created but not executed. If the database file is to be executed, the YES branch of decisional step 224 leads to step 226.

At step 226, the object management module 26 executes the database file. Execution of the database file generates the database objects defined by the parameters entered at step 202. Next, at step 228, the object management module 26 reports the status of the file execution. Proceeding to step 230, the actions of the object management module 26 and the user may be logged in the log file 40. Actions logged may include execution of the database files.

Accordingly, the present invention provides a database program 18 that automatically creates database files in response to a request by the user. The extent of user interactions is only to inform the database program of the file parameters of the desired database object. Moreover, the database program 18 allows the user to decide whether to print, edit or execute database files that are created. Thus, for example, a user may have a database file created but delay execution of the database file until a later time or date.

Figure 4:
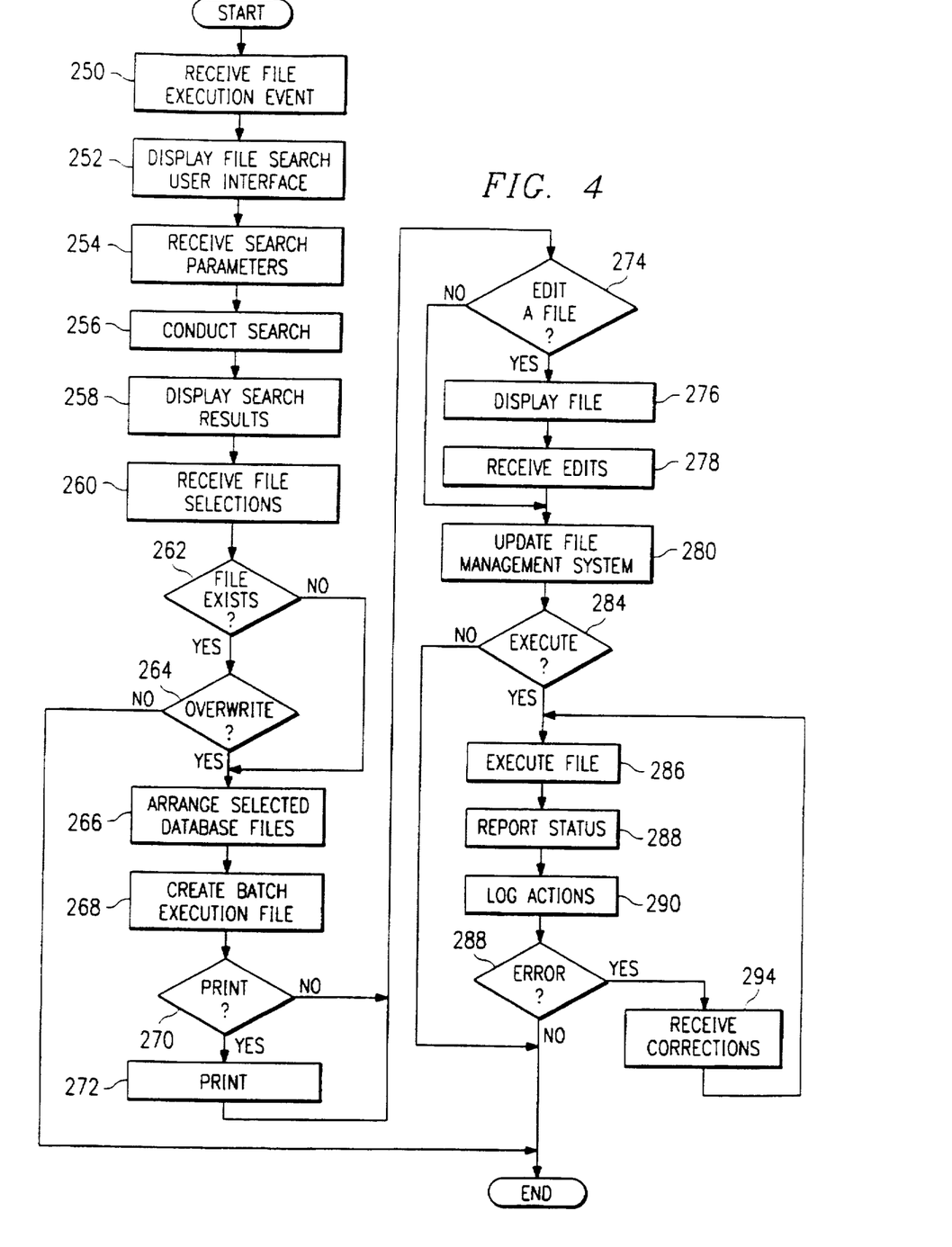
FIG. 4 is a flowchart of a method of creating batch execution files in accordance with the present invention.

FIG. 4 is a flowchart of a method of the present invention for automatically generating the batch execution file 42 and executing database files identified by the batch execution file 42. The method begins at step 250 wherein the batch schema generation module 34 receives a file execution event for a specified environment.

In response to the file execution event, at step 252, the object maintenance module 30 may display a file search user interface. The file search user interface may include a filter to allow a user to select a desired type or pattern of database files. As previously discussed, the user may enter data and selections into the user interface with the pointing device 118 and/or keyboard 120.

Proceeding to step 254, the object maintenance module 30 receives the search parameters requested by the user. At step 256, the object maintenance module 30 searches the specified environment for database files matching the type or pattern indicated by the user. Results of the search are displayed at step 258. The results may be displayed by user interface on the display 126.

In this embodiment, the user may select particular database files identified by the search for execution. Files may be selected with the mouse 118 or the keyboard 120. At step 260, the object maintenance module 30 receives file selections from the user. Step 260 leads to decisional step 262.

At decisional step 262, the object maintenance module 30 may determine whether the batch execution file already exists. Existence of the batch execution file may be determined by querying the file management system of the specified environment. If the batch execution file 42 exists, the YES branch of decisional step 262 leads to decisional step 264.

At decisional step 264, the object maintenance module 30 determines whether the batch execution file 42 is to be overwritten. In one embodiment, the batch execution file 42 may be overwritten when requested by the user. In this embodiment, the user may request that the batch execution file 42 be overwritten by choosing a selection in the user interface. If the user chooses not to overwrite the batch execution file 42, the NO branch of decisional step 264 leads to the end of the process. Thus, a batch execution file 42 is not generated. If an existing batch execution file 42 is to be overwritten, the YES branch of decisional step 264 leads to step 266.

At step 266, the object maintenance module 30 automatically arranges the selected database files in accordance with a predefined ordering scheme defined by the user, data configuration language, and/or UNIX scripts. Next, at step 268, the object maintenance module 30 automatically generates the batch execution file 42. The batch execution file 42 may comprise UNIX scripts operable to execute the selected database files.

Proceeding to decisional step 270, the object maintenance module 30 determines whether the batch execution file 42 is to be printed. In one embodiment, the batch execution file 42 may be printed when requested by the user. In this embodiment, the user may request printing by choosing a selection in the user interface. If the batch execution file 42 is to be printed, the YES branch of decisional step 270 leads to step 272. At step 272, the batch execution file 42 is printed. Step 272 leads to decisional step 274. Additionally, if the batch execution file 42 is not to be printed at decisional step 270, the NO branch of decisional step 270 leads also to decisional step 274.

At decisional step 274, it is determined whether the batch execution file 42 is to be edited. In one embodiment, the batch execution file 42 may be edited when requested by the user. If the batch execution file 42 is to be edited, the YES branch of decisional step 274 leads to step 276. At step 276, the batch execution file 42 may be displayed for editing. Next, at step 278, the object maintenance module 30 may receive edits to the batch execution file 42. Step 278 leads to step 280. Additionally, if the batch execution file 42 is not to be edited at the decisional step 274, the NO branch of decisional step 274 leads also step 280.

At step 280, the file management system 20 may be updated. Accordingly, the file management system 20 may include a copy of the batch execution file 42. Step 280 leads to decisional step 284.

At decisional step 284, it is determined whether the batch execution file 42 is to be executed. In one embodiment, the batch execution file 42 may be executed when requested by the user. In this embodiment, the user may request execution by choosing a selection from the user interface. If the batch execution file 42 is not to be executed, the NO branch of decisional step 284 leads to the end of the process. Thus, the batch execution file 42 is created but not executed. If the batch execution file 42 is to be executed, the YES branch of decisional step 284 leads to step 286.

At step 286, the batch execution file 42 is executed. The batch execution file 42 executes the database files one at a time and monitors the process for execution errors. Next, at step 288, the object maintenance module 30 reports the execution status of the batch execution file 42. At step 290, the actions of the object maintenance module 30 and the user may be logged. Actions logged may include any execution errors of the database files that occured during execution of the batch execution file 42.

Proceeding to decisional step 292, it is determined whether an error that caused a database file to fail execution is to be corrected. In one embodiment, the database file may be corrected when requested by the user. In this embodiment, the user may request correction by choosing a selection from the user interface. If a database file that failed execution is to be corrected, the YES branch of decisional step 292 leads to step 294. At step 294, the object maintenance module 30 may receive corrections for the problem that caused the execution error. The corrections may be received from the user through the user interface.

Step 294 returns to step 286 where the file is re-executed. The remaining database files of the batch execution file 42 that follow the failed database file are also executed in accordance with their predefined priority scheme. If no further error conditions are encountered during execution of the database files or if any execution errors that occured are not to be corrected, the NO branch of decisional step 292 leads to the end of the process.

Accordingly, the present invention provides a database program 18 that automatically creates a batch execution file 42 to execute one or more database files. The database files are executed one at a time by the batch execution file 42. If an error occurs during execution of a database file, execution of that database file and the batch file is stopped and the user allowed to edit the database file. Thereafter, execution of database file and the batch execution file is resumed. Thus, the present invention provides an automatic and an efficient system for executing and editing database files.

Figure 5:
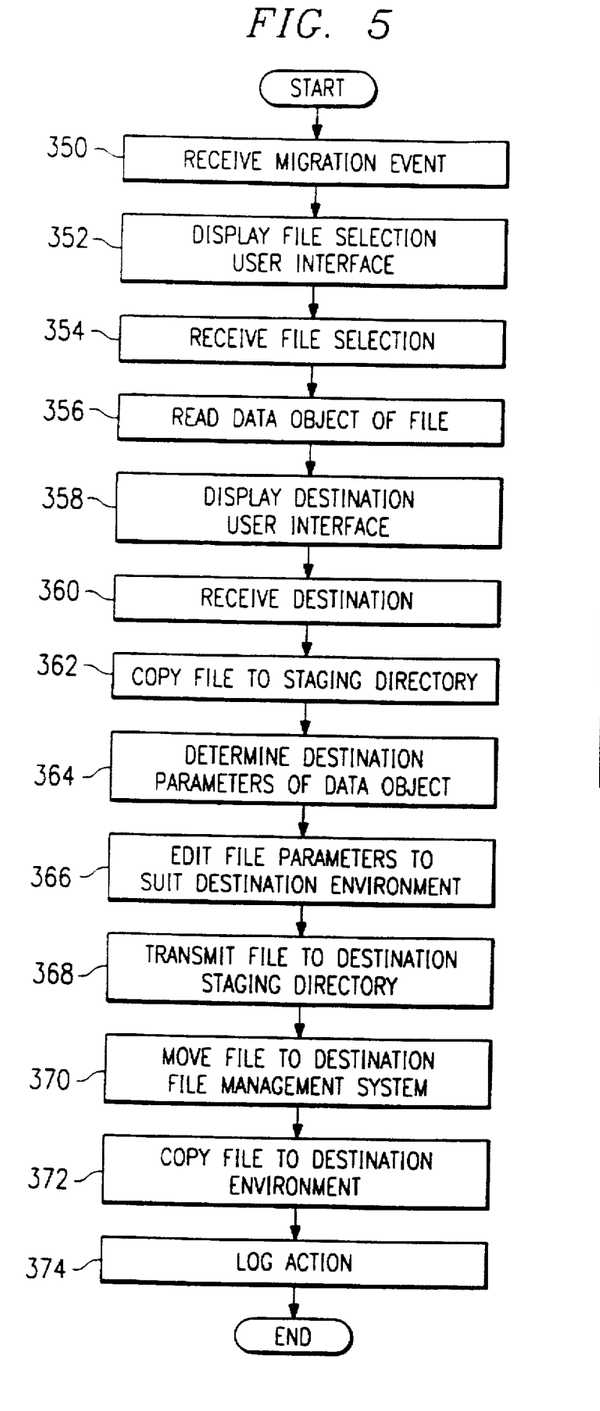
FIG. 5 is a flowchart of a method of migrating database files in accordance with the present invention.

FIG. 5 is a flowchart of a method of the present invention for automatically migrating database files between disparate environments. As previously discussed, a database may exist in multiple test and production environments. The migration process of the present invention allows database files of different environments to be maintained in "sync" with one another.

The method begins at step 350 wherein the migration module 36 receives a migration event. The migration event may be a request by a user to update a specified environment. Next, at step 352, the migration module 36 may display a file selection user interface. As previously discussed, the user may input data or make selections in the user interface using the mouse 118 and/or the keyboard 120.

Next, at step 354, the migration module 36 receives a file selection. At step 356, the migration module 36 may read the data objects of the file. The data objects are read such that they may be resized or altered as necessary when migrated to another environment.

Proceeding to step 358, the migration module 36 may display a destination user interface. Typically, the user may identify the destination, or target, by identifying the device and environment of the destination. At step 360, the migration module 36 receives the destination information. At step 362, the database file may be copied to a staging directory.

Next, at step 364, the migration module 36 may automatically determine destination parameters of the database file. As previously discussed, for example, objects of database files may be resized when moved to the production environment 48.

Proceeding to step 366, the migration module 34 may automatically edit file parameters of the database file to suit the destination environment. For example, security or similar types of attributes may be altered between environments. Alterations to the database file may be made by the migration module 36 to correspond with the configuration of the destination environment.

Next, at step 368, the database file may be transmitted to a destination staging directory. For the embodiment shown by FIG. 1, a database file may be transferred from the staging directory 43 of the development system 12 to a staging directory 45 of production system 14.

Proceeding to step 370, the database file may be moved from the destination staging directory to the file management system of the destination system. At step 372, the database file may be copied to the destination environment.

Next, at step 374, the migration actions may be logged into the log file 40. Accordingly, a database file existing on a first system, such as the development system 12, may be migrated to another system, such as the production system 14. Accordingly, the present invention automatically migrates files between disparate environments of a database system.

Figure 6:
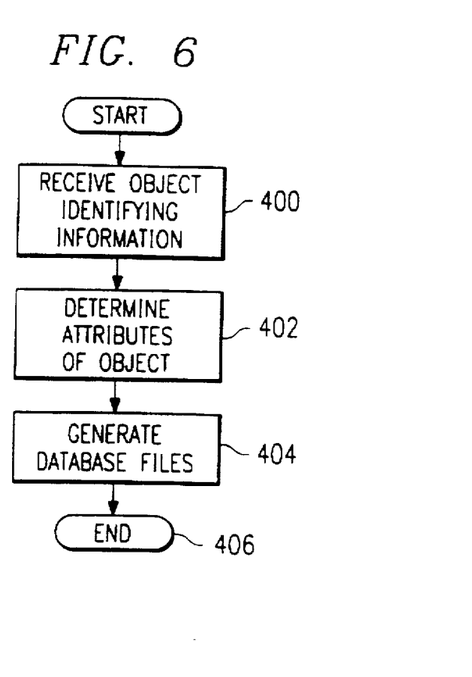
FIG. 6 is a flowchart of a method of generating database files from a foreign database object in accordance with the present invention.

FIG. 6 is a flowchart of a method of the present invention for "reverse engineering" a database object, or generating database files from an existing database object. The method begins at step 400, where the batch schema generation module 34 receives user input identifying a foreign database object. As previously described, the foreign database object is a database object generated by a database system other than the database system in which it is currently residing.

Next, at step 402, the batch schema generation module 34 may determine the attributes of the foreign database object. After the attributes of the object have been determined, the batch schema generation module 34 may automatically generate the database files capable of recreating the database object at step 404. Creation of the database files for the object allows database program 18 to regenerate the database object, which can then be used and synchronized throughout several environments as described above in connection with FIG. 5. Accordingly, the present invention allows database objects created by different systems to be used and synchronized in disparate environments by automatically generating database files that can be synchronized across the environments.

Although the present invention and its advantages have been described in detail, it should be understood that various changes, substitutions and alterations can be made therein without departing from the spirit and scope of the invention as defined by the appended claims.

What is claimed is:

1. A database system comprising:
    a plurality of database files operable to automatically generate database objects; and
    an object maintenance module operable to automatically generate a batch execution file, the batch execution file operable to execute at least two of the database files.

2. The database system of claim 1, wherein the object maintenance module is further operable to automatically arrange an execution order of the database files executed by the batch execution file in accordance with a predefined priority scheme.

3. The database system of claim 1, wherein the database system is operable to automatically stop execution of a database file being executed by the batch execution file in response to an execution error.

4. The database system of claim 3 wherein the database system is further operable to receive edits of the database file.

5. The database system of claim 4 wherein the database system is further operable to resume execution of the database file.

6. A method for generating a database batch execution file, comprising the steps of:
    receiving selections identifying a plurality of database files operable to automatically generate database objects; and
    automatically generating a batch execution file operable to execute database files.

7. The method of claim 6 and further comprising the step of executing the batch execution file.

8. The method of claim 6 and further comprising the step of automatically arranging an execution order of the database files executed by the batch execution file in accordance with a predefined priority scheme.

9. The method of claim 6 and further comprising the step of automatically stopping execution of a database file being executed by the batch execution file in response to an execution error.

10. The method of claim 9 and further comprising the step of receiving edits of the database file.

11. The method of claim 10 and further comprising the step of resuming execution of the database file.

12. A system for generating database files, comprising:
    a database object foreign to the system; and
    a batch schema generation module operable to automatically generate a database file, the database file operable to regenerate the foreign database object.

13. The system of claim 12, wherein the database file comprises a first database file and a second database file, the second database file operable to execute the first database file to regenerate the foreign database object.

14. The system of claim 13, wherein the first database file comprises a database definition language file.

15. The system of claim 13, wherein the second database file comprises a UNIX script file.

16. A method for generating database files, comprising the steps of:
    receiving a selection identifying a database object foreign to a system; and
    automatically generating within the system a database file operable to regenerate the foreign database object.

17. The method of claim 16, wherein the step of generating the database file comprises the steps of:
    generating a first database file operable to regenerate the foreign database object; and
    generating a second database file operable to execute the first database file.

18. A system for migrating database files, comprising:
    a first database environment including a first set of database files; and
    a migration module operable to automatically generate in a first staging directory a second set of database files from the first set of database files, the second set of database files for use in connection with a second database environment, the migration module further operable to transfer the second set of database files from the first staging directory to a second staging directory in the second database environment.

19. The system of claim 18 and further comprising a file management system associated with the second database environment, the file management system operable to store a copy of the second set of database files.

20. A method for migrating database files, comprising the steps of:

receiving a selection identifying a first set of database files in a first database environment;

in a first staging directory, automatically generating from the first set of database files a second set of database files for use in connection with a second database environment;

transferring the second set of database files from the first staging directory to a second staging directory; and transferring the second set of database files from the second staging directory to the second database environment.

21. The method of claim 20 and further comprising the step of copying the second set of database files into a file management system associated with the second environment.

* * * * *